US010222200B2

(12) United States Patent
Hatcher, Jr. et al.

(10) Patent No.: US 10,222,200 B2
(45) Date of Patent: Mar. 5, 2019

(54) CONTACTLESS, BLADE-TIP CLEARANCE MEASUREMENT FOR TURBINES

(71) Applicant: SIEMENS ENERGY, INC., Orlando, FL (US)

(72) Inventors: Clifford Hatcher, Jr., Orlando, FL (US); James P. Williams, Orlando, FL (US); Mahmood K. Silieti, Orlando, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 179 days.

(21) Appl. No.: 15/593,354

(22) Filed: May 12, 2017

(65) Prior Publication Data

US 2018/0328721 A1     Nov. 15, 2018

(51) Int. Cl.
*F01D 5/12* (2006.01)
*F01D 11/08* (2006.01)
(Continued)

(52) U.S. Cl.
CPC ............ *G01B 11/14* (2013.01); *F01D 5/12* (2013.01); *F01D 11/08* (2013.01); *F01D 21/003* (2013.01);
(Continued)

(58) Field of Classification Search
CPC ......... G01B 11/14; F01D 25/24; F01D 11/08; F01D 5/12; F01D 21/003; F05D 2260/80;
(Continued)

(56) References Cited

U.S. PATENT DOCUMENTS

| 4,322,887 A | 4/1982 | Burton |
| 4,395,827 A | 8/1983 | Stowe et al. |

(Continued)

FOREIGN PATENT DOCUMENTS

| DE | 1919945 A1 | 4/1971 |
| DE | 002730508 A1 | 1/1979 |

(Continued)

OTHER PUBLICATIONS

PCT International Search Report and Written Opinion of International Searching Authority dated Jul. 4, 2018 corresponding to PCT International Application No. PCT/US2018/028781 filed Apr. 23, 2018.

(Continued)

*Primary Examiner* — Que Tan Le
*Assistant Examiner* — Jennifer D Bennett (57) ABSTRACT

Turbine blade-tip clearance is measured in a fully assembled turbine casing by mounting a probe tip of a non-contact displacement probe in an inspection port of a vane cavity at a known distance relative to the inner circumferential surface of the corresponding ring segment. The displacement probe generates displacement samples that are indicative of probe tip distance from the turbine blade tip. Variations in probe distance data are recorded as the blade circumferentially sweeps the turbine casing. A data processing system correlates the distance data with localized blade-tip clearance gap. In some embodiments, blade rotational position data are collected by a rotational position sensor. In those embodiments, the data processing system correlates the distance and rotational position data with localized blade tip gap at angular positions about the turbine casing circumference.

19 Claims, 5 Drawing Sheets

(51) Int. Cl.
*F01D 21/00* (2006.01)
*F01D 25/24* (2006.01)
*G01B 11/14* (2006.01)

(52) U.S. Cl.
CPC .......... *F01D 25/24* (2013.01); *F05D 2220/31* (2013.01); *F05D 2220/32* (2013.01); *F05D 2230/72* (2013.01); *F05D 2260/80* (2013.01); *F05D 2270/80* (2013.01)

(58) Field of Classification Search
CPC ............. F05D 2230/72; F05D 2270/80; F05D 2220/32; F05D 2220/31
See application file for complete search history.

(56) References Cited

U.S. PATENT DOCUMENTS

| | | |
|---|---|---|
| 4,518,917 A | 5/1985 | Oates et al. |
| 4,632,352 A | 12/1986 | Stoll |
| 4,704,906 A | 11/1987 | Churchill et al. |
| 4,911,004 A | 3/1990 | Leon |
| 4,987,555 A | 1/1991 | Twerdochlib |
| 5,670,879 A | 9/1997 | Zombo et al. |
| 6,575,011 B1 | 6/2003 | Busby et al. |
| 6,848,193 B1 | 2/2005 | Kirzhner |
| 7,579,844 B2 | 8/2009 | Ducheminsky et al. |
| 8,102,539 B2 | 1/2012 | Ghulam |
| 8,138,753 B2 | 3/2012 | Eberl et al. |
| 8,174,931 B2 | 5/2012 | Vartanian et al. |
| 8,482,302 B2 | 7/2013 | Suckling et al. |
| 8,485,038 B2 | 7/2013 | Sengupta et al. |
| 8,684,669 B2 | 4/2014 | Chehab et al. |
| 9,068,906 B2 | 6/2015 | Silieti et al. |
| 9,513,117 B2 | 12/2016 | Ruhge et al. |
| 9,581,440 B2 | 2/2017 | Ruhge et al. |
| 2001/0013582 A1* | 8/2001 | Johnson ................... F01D 11/08 250/559.29 |
| 2003/0020496 A1 | 1/2003 | Eyraud et al. |
| 2003/0222640 A1 | 12/2003 | Twerdochlib et al. |
| 2004/0251916 A1* | 12/2004 | Kirzhner ................... G01B 7/14 324/635 |
| 2005/0088271 A1 | 4/2005 | Lau et al. |
| 2007/0005294 A1* | 1/2007 | Andarawis ............. G01B 7/144 702/155 |
| 2008/0190211 A1 | 8/2008 | Secq |
| 2008/0218181 A1 | 9/2008 | Ducheminsky et al. |
| 2009/0000101 A1 | 1/2009 | Reynolds et al. |
| 2009/0165540 A1 | 7/2009 | Craig |
| 2009/0289620 A1 | 11/2009 | Suckling et al. |
| 2010/0046008 A1 | 2/2010 | Ghulam |
| 2010/0117859 A1 | 5/2010 | Mitchell et al. |
| 2011/0103933 A1 | 5/2011 | Olesen et al. |
| 2011/0243708 A1* | 10/2011 | Hafner .................... F01D 11/20 415/1 |
| 2012/0069355 A1 | 3/2012 | Hynous |
| 2013/0167392 A1 | 7/2013 | Boyer et al. |
| 2013/0312249 A1 | 11/2013 | Buchal et al. |
| 2015/0090017 A1 | 4/2015 | Silieti et al. |
| 2015/0090882 A1 | 4/2015 | Ruhge et al. |
| 2015/0092039 A1 | 4/2015 | Ruhge et al. |

FOREIGN PATENT DOCUMENTS

| | | | |
|---|---|---|---|
| EP | 0242107 A2 | 10/1987 | |
| GB | 2112080 A1 | 8/1985 | |
| GB | 2397656 A1 | 7/2004 | |
| GB | 2460248 A | 1/2011 | |
| GB | 2462829 A | 2/2011 | |
| JP | S6153464 A | 3/1986 | |
| JP | S61161407 A | 7/1986 | |
| JP | H021985 B2 * | 1/1990 | ............. F03B 11/04 |

OTHER PUBLICATIONS

Analog Devices Programmable 360° C. Inclinometer ADIS16203, publication No. D06108-0-1/10(A), Copyright 2006-2010, by Analog Devices Inc. of Norwood, Massachusetts.
Bluetooth Accessory Pack BAP1.0, Philtec E-Newsletter, Dec. 9, 2012, ww.philtec.com.
RPI-1031 for a surface mount type 4 direction detector, Appendix 1-Rev 2.0, copyright 2008, published by ROHM Co. Ltd., Kyoto, Japan.

* cited by examiner

CONTACTLESS, BLADE-TIP CLEARANCE MEASUREMENT FOR TURBINES

The entire disclosure of U.S. Pat. No. 9,513,117, issued on Dec. 6, 2016, and entitled "Situ Blade Mounted Tip Gap Measurement for Turbines" is hereby incorporated by reference in its entirety.

TECHNICAL FIELD

The invention relates to in-situ measurement of steam or gas turbine blade tip clearance or gap between rotating blades and the circumscribing turbine casing ring segment (tip-gap). More particularly, embodiments relate to contactless, in-situ, blade tip-gap measurement by mounting a radially oriented, a non-contact, sensor probe in an existing inspection port of a ring segment, which faces an in-situ turbine blade tip, and rotating the rotor so that one or more of the blade tips sweeps past the contactless displacement sensor. In some embodiments, all blade tips sweep past the contactless displacement sensor while the turbine engine is operated in turning gear mode. Blade tip clearances for one or more individual blades, at the inspection port location on the engine's ring segment, are determined and recorded.

BACKGROUND

During assembly, and at periodic times throughout the life of a gas turbine, blade tip clearances must be measured. Proper tip clearance enables better efficacy of gas turbines and lowers harmful emissions. To date there are ways of measuring tip clearances, but the methods require the removal of the upper casing that circumscribes the turbine blade tips during measurement. Methods for measuring tip clearances in fully assembled engines are time consuming; they also rely on skill of trained measuring technicians for measurement sampling accuracy and repeatability.

There are typically two known common methods for measuring blade tip clearances. In the first method, the measurement of tip clearance is typically accomplished by removing the upper half of the turbine or compressor outer casing, to provide access to the blades in the compressor or turbine sections of the engine. Shims are then inserted between the blades tips and the flow path side or ring segments of the lower case at the horizontal joint. Measurements are typically taken at the leading and trailing edge sides of the blade tips for every blade. These measurements are referred to as half shell measurements. This method provides very little accuracy or reproducibility because the lower case tends to change shape without the upper case in place. In addition, the measurement locations in the half shell are not necessarily representative of the local case shape at multiple angular rotational positions about the entire rotational surface swept by the turbine blade.

The second known common method for measuring blade tip clearances is by opening an inspection port in the side of the engine, through an access port, in the turbine vane carrier, through the ring segment, which is aligned with the blade path.

A contact-type probe, typically a mechanical dial indicator, is inserted into the access port of the vane carrier. Radial distance (A) from a known reference location in the carrier access port to the inner circumferential surface of the ring segment substrate facing the blade tips is known. While the blades are rotating at 6-10 rpm, a technician lowers the probe tip into the rotating path of the blade tips. Once the dial indicator starts to flutter, due to contacting the blade tips, the measurement is recorded manually, which is radial distance (B) from the same known reference location in the carrier access port to the blade tip. Clearance between one or more of the blade tips, to inner circumferential surface of the ring segment substrate, is determined by subtracting radial distance (A) from radial distance (B). Accurate reading of a fluttering dial indicator is subjective, giving only a maximum-minimum range of reading within the observed flutter range indicated by the dial indicator. Repeatability issues also arise, when readings are taken at a different time and/or by different technicians. When the fluttering, dial indicator readings, taken while the engine is in "turning gear" mode are recorded, they constitute maximum and minimum clearances for all of the blades in the blade row. It is not possible to ascertain individual tip clearances for individual blades when mechanical dial indicator readings are taken in turning gear mode. Tip clearance measurements for individual blades require manual, sequential turning of the engine rotor until each individual blade tip is oriented under the dial indicator tip. The tip gap is then measured while the blade is stationary. The gap measurement process is repeated sequentially, by moving the next desired blade under the dial indicator tip, which is time consuming. Measurement errors for each individual blade reading are possible if the dial indicator tip is not aligned on exactly the same indexed position for each blade tip. In addition, local topography variations across the surface of each individual blade tip do not assure determination of maximum or minimum clearances for each individual blade. For example, if a mechanical dial indicator reading is taken at the blade tip at the pressure (concave) side of the airfoil, its clearance may vary locally compared to the same reading taken at the suction (convex) side of the airfoil.

SUMMARY OF INVENTION

The present invention facilitates real-time recorded, sequential sampling of blade-tip clearance readings, for each individual blade, taken while the engine rotor is in turning gear mode, or if desired by sequentially moving and positioning individual, stationary blades within the sampling zone. Other embodiments facilitate real-time recorded, sequential sampling across each individual turbine blade tip surface, from its pressure side to its suction side, for higher resolution, higher accuracy, and higher repeatability tip clearance determination—whether in turning gear mode or in individual blade stationary measurement mode—as compared to previously known, mechanical dial indicator tip clearance measurement techniques. In embodiments described herein, a non-contact, displacement sensor probe, such as an ultrasonic, photonic, or other electro-magnetic, non-contact, absolute-displacement sensor probe, is inserted in an inspection port, such as a vane carrier access port, that is aligned between the inner circumference of the ring segment substrate and the opposed, rotating turbine blade tip. The non-contact, absolute-displacement sensor probe, and any related data acquisition system, determine actual, radial distance between the probe tip and its opposing turbine blade tip, which comprises a data sample. After the data sample of actual, radial distance between the probe tip and the blade tip is created, tip-gap is determined by subtracting a known distance between the probe tip and the inner circumferential surface of the ring seal from the data sample distance. In some embodiments, the tip-gap determination performed as follows. Radial distance (I) from the contactless probe's measurement tip to a known reference location in the carrier access port is added to the data sample of the measured displacement distance (II) between the probe tip and the opposing blade tip. Blade tip-ring segment clearance (tip-gap) is determined by subtracting radial distance (III) from the same reference location in the access port and the inner circumference of the substrate surface of the ring segment from the sum of the distances (I) and (II). In engines having coating surfaces applied over the ring segment substrate, such as metallic bond coats or thermal barrier coatings, the combined thicknesses (IV) of such coating surfaces is also subtracted with (III) to determine the blade tip-ring segment clearance or gap.

In some embodiments, a plurality of displacement samples (II) are captured and recorded periodically and sequentially as the turbine rotor is rotated in turning gear mode. The individual displacement samples (II) are associated with individual blades, so that blade tip-ring segment clearance for one or more of the blades, and/or variations of such clearance across the width of an individual blade is determined. In some embodiments, a tip-gap inspection fixture is utilized, in order to align the measurement tip of the contactless displacement probe at a known radial distance with respect to a known reference location within a cavity port of a turbine vane. In some embodiments, the tip-gap inspection fixture has a probe carrier collar with external threads for engagement within mating threads formed in the access port of the turbine vane carrier. The probe carrier collar aligns the tip of the contactless probe in a known radial position with respect to the known reference location within the cavity port of the turbine vane. Contactless probe displacement samples are converted to displacement distance samples, such as in a data acquisition system that is associated with the displacement probe. A data analyzer system, which in some embodiments is incorporated in a personal computer or tablet computer, utilizes the displacement samples to calculate blade tip-ring segment clearance or gap by the addition and subtraction of the measurements (I)-(III) or (I)-(IV), previously described. In some embodiments, a rotor position encoder provides rotor angular position information to the data analyzer. The data analyzer correlates one or more contactless displacement probe samples and the rotor angular position information provided by the rotor position encoder with an individual turbine blade that is coupled to the rotor at a known, fixed angular position on the rotor circumference.

Exemplary embodiments of the invention feature a method for measuring radial clearance gap between one or more blade tips and an opposing, inner circumferential surface of a ring seal within a turbine casing of a turbine engine (tip-gap). The turbine engine upon which the method is performed has an engine outer casing and ring seal, which circumscribe an in situ, rotatable rotor having a row of turbine blades. Each blade respectively has an airfoil and a blade tip in opposed spaced relationship with an inner circumferential surface of the ring seal, defining a tip gap between themselves. The ring seal has a necked, cylindrical-profile inspection port that is accessible from outside the engine outer casing. The inspection port defines a central axis that is axially and radially aligned with tangential swept path of the blade tips, and includes: an upper cylindrical portion having a first diameter, which is contiguous with an outer diameter of an inspection port shoulder. An inner diameter of the same inspection port shoulder is contiguous with a smaller second diameter, inspection port aperture. The inspection port aperture terminates and is coextensive with the inner circumferential surface of the ring seal, and defines female threads on its outer circumference. The method is further practiced by providing a tip-gap inspection system, including: a tip-gap inspection fixture having an outer tube for insertion of a distal end thereof into the inspection port of the ring seal; a probe carrier coupled to the distal end of the outer tube, defining a probe carrier shoulder and male threads for engagement with the female threads of the inspection port aperture; and a non-contact, absolute-displacement sensor probe, coupled to the probe carrier. The probe has a probe tip, for generating a displacement data set, indicative of absolute relative distance between the probe tip and any one of the respective blade tips that is aligned therewith, without rotor rotation or reference to relative, differential displacement data of any other blade tip. The method is further practiced by providing a data acquisition system, coupled to the sensor probe, for converting the displacement data to actual absolute distance between the probe tip and the respective blade tips that are aligned therewith. The method is further practiced by providing a data analyzer system, coupled to the data acquisition system, for determining absolute radial clearance gap between any one or more of the respective, individual blade tips and the inner circumferential surface of the ring seal. The data analyzer system determines actual absolute distance between the probe tip and each respective blade tip with the displacement data provided by the data acquisition system. The data analyzer system thereafter subtracts, from the determined absolute distance between the probe tip and the respective blade tip, a known distance between the probe tip and the inner circumferential surface of the ring seal that is contiguous with the probe aperture. The outer tube of the tip-gap inspection fixture is inserted and rigidly coupled into the inspection port, in fixed alignment with the inspection port aperture, by engaging and screwing together the respective threads of the probe carrier and the inspection port aperture, until their respective shoulders are in abutting contact with each other. After the shoulders are in abutting contact with each other the probe tip of the displacement probe is radially aligned, in fixed, opposed, spaced relationship with the swept path of the blade tips. Next, the rotor is rotated so that the blade tip of one or more respective blades sweeps the inspection port aperture and the probe tip of the non-contact, absolute-displacement sensor probe, while generating the displacement data set, inclusive of data for each individual sweeping blade. The displacement data set is acquired with the data acquisition system. Tip-gap between each respective blade tip and the ring seal at the inspection port aperture is determined, with the displacement data set and the data analyzer, by obtaining from the data acquisition system, a displacement data sample that is indicative of actual absolute distance between the probe tip and the respective blade tip; thereafter, subtracting from the obtained absolute distance between the probe tip and the respective blade tip, a previously known distance between the probe tip and the inner circumferential surface of the ring seal that is contiguous with the probe aperture.

Other exemplary embodiments of the invention feature a method for measuring radial clearance gap between one or more blade tips and an opposing, inner circumferential surface of a ring seal within a turbine casing of a turbine engine (tip-gap). The turbine engine upon which the method is performed has an engine outer casing and ring seal, which circumscribe an in situ, rotatable rotor having a row of turbine blades. Each blade is respectively: oriented at a known angular position about the rotor circumference, having an airfoil and a blade tip in opposed spaced relationship with an inner circumferential surface of the ring seal, defining a tip gap there between; the ring seal having a necked, cylindrical-profile inspection port that is accessible from outside the engine outer casing, the inspection port defining a central axis that is axially and radially aligned with tangential swept path of the blade tips, and including: an upper cylindrical portion having a first diameter, which is contiguous with an outer diameter of an inspection port shoulder, an inner diameter of the inspection port shoulder contiguous with smaller second diameter, inspection port aperture; the inspection port aperture terminating and coextensive with the inner circumferential surface of the ring seal, and defining female threads on its outer circumference. The method is further practiced by providing a tip-gap inspection system, including: a tip-gap inspection fixture having an outer tube for insertion of a distal end thereof into the inspection port of the ring seal; a probe carrier coupled to the distal end of the outer tube, defining a probe carrier shoulder and male threads for engagement with the female threads of the inspection port aperture; and a non-contact, absolute-displacement sensor probe, coupled to the probe carrier. The probe has a probe tip, for generating a displacement data set, indicative of absolute relative distance between the probe tip and any one of the respective blade tips that is aligned therewith, without rotor rotation or reference to relative, differential displacement data of any other blade tip. The provided tip-gap inspection system has a rotor rotational-position sensor, for generating a rotational-position data set indicative of absolute rotor rotational position relative to the ring seal, as the rotor is rotated. The method is further practiced by providing a data acquisition system, coupled to the sensor probe, for converting the displacement data to actual absolute distance between the probe tip and the respective blade tips that are aligned therewith. The method is further practiced by providing a data analyzer system, coupled to the rotor rotational position sensor, and the data acquisition system, for determining absolute radial clearance gap between any one or more of the respective, individual blade tips and the inner circumferential surface of the ring seal. The data analyzer system determines actual absolute distance between the probe tip and each respective blade tip with the displacement data provided by the data acquisition system. The data analyzer system thereafter subtracts, from the determined absolute distance between the probe tip and the respective blade tip, a known distance between the probe tip and the inner circumferential surface of the ring seal that is contiguous with the probe aperture. The outer tube of the tip-gap inspection fixture is inserted and rigidly coupled into the inspection port, in fixed alignment with the inspection port aperture, by engaging and screwing together the respective threads of the probe carrier and the inspection port aperture, until their respective shoulders are in abutting contact with each other. After the shoulders are in abutting contact with each other the probe tip of the displacement probe is radially aligned, in fixed, opposed, spaced relationship with the swept path of the blade tips. Next, the rotor is rotated so that the blade tip of one or more respective blades sweeps the inspection port aperture and the probe tip of the non-contact, absolute-displacement sensor probe, while generating the displacement data set, inclusive of data for each individual sweeping blade. The displacement data set is acquired with the data acquisition system, as the data analyzer system simultaneously acquires the rotational-position data set from the rotational-position sensor. Tip-gap between each respective blade tip and the ring seal at the inspection port aperture is determined by the data analyzer, with the respective displacement data set obtained from the data acquisition system and the rotational data set obtained from the rotational-position sensor. The data analyzer system obtains from the data acquisition system, a displacement data sample that is indicative of actual absolute distance between the probe tip and the respective blade tip. Thereafter, the data analyzer system subtracts from the obtained absolute distance between the probe tip and the respective blade tip, a previously known distance between the probe tip and the inner circumferential surface of the ring seal that is contiguous with the probe aperture. The data analyzer system obtains from the rotational-position sensor a rotational-position sample, which corresponds to the obtained displacement data sample. The data analyzer system associates the rotational-position sample with a specific turbine blade whose tip is aligned with the probe tip of the non-contact, absolute-displacement sensor probe, based on prior knowledge of specific blade angular orientation about the rotor circumference.

Additional exemplary embodiments of the invention feature an inspection system for measuring radial clearance gap between one or more blade tips and an inner circumferential surface of a ring seal within a turbine engine (tip-gap). The engine is of the type having which circumscribe an in situ, rotatable rotor having a row of turbine blades. Each blade respectively has an airfoil and a blade tip in opposed spaced relationship with an inner circumferential surface of the ring seal, defining a tip gap between themselves. The ring seal has a necked, cylindrical-profile inspection port that is accessible from outside the engine outer casing. The inspection port defines a central axis that is axially and radially aligned with tangential swept path of the blade tips, and includes: an upper cylindrical portion having a first diameter, which is contiguous with an outer diameter of an inspection port shoulder. An inner diameter of the same inspection port shoulder is contiguous with a smaller second diameter, inspection port aperture. The inspection port aperture terminates and is coextensive with the inner circumferential surface of the ring seal, and defines female threads on its outer circumference. The tip-gap inspection system includes a tip-gap inspection fixture having an outer tube for insertion of a distal end thereof into the inspection port of the ring seal; a probe carrier coupled to the distal end of the outer tube, defining a probe carrier shoulder and male threads for engagement with the female threads of the inspection port aperture; and a non-contact, absolute-displacement sensor probe, coupled to the probe carrier. The probe has a probe tip, for generating a displacement data set, indicative of absolute relative distance between the probe tip and any one of the respective blade tips that is aligned therewith, without rotor rotation or reference to relative, differential displacement data of any other blade tip. The probe tip is axially and radially aligned, in fixed, opposed, spaced relationship with the tangential swept path of the blade tips. The tip-gap inspection system also includes a rotor rotational-position sensor, for generating a rotational-position data set indicative of absolute rotor rotational position relative to the ring seal, as the rotor is rotated. The tip-gap inspection system further includes a data acquisition system, coupled to the sensor probe, for converting the displacement data to actual absolute distance between the probe tip and the respective blade tips that are aligned with the probe tip. The tip-gap inspection system additionally includes a data analyzer system, coupled to the rotor rotational position sensor, and the data acquisition system, for determining tip-gap between each respective blade tip and the ring seal at the inspection port aperture with the rotational-position and displacement data sets. The data analyzer system determines tip-gap, by obtaining from the data acquisition system, a displacement data sample that is indicative of actual absolute distance between the probe tip and the respective blade tip. Thereafter the data analyzer system subtracts from the obtained absolute distance between the probe tip and the respective blade tip, a previously known distance between the probe tip and the inner circumferential surface of the ring seal that is contiguous with the probe aperture. The data analyzer system also obtains from the rotational-position sensor a rotational-position sample, which corresponds to the obtained displacement data sample. The data analyzer system associates the rotational-position sample with a specific turbine blade whose tip is aligned with the probe tip of the non-contact, absolute-displacement sensor probe, based on prior knowledge of specific blade angular orientation about the rotor circumference.

The respective features of the exemplary embodiments of the invention that are described herein may be applied jointly or severally in any combination or sub-combination.

BRIEF DESCRIPTION OF DRAWINGS

The exemplary embodiments are further described in the following detailed description in conjunction with the accompanying drawings, in which.

To facilitate understanding, identical reference numerals have been used, where possible, to designate identical elements that are common to the figures. The figures are not drawn to scale.

DESCRIPTION OF EMBODIMENTS

Exemplary embodiments described herein are utilized to measure blade-tip clearance in fully- or partially-assembled turbine engines, such as combustion turbine engines. Blade-tip clearance is measured by mounting a probe tip of a non-contact displacement probe in an inspection port located within a vane cavity of the engine's ring segment at a known distance relative to the inner circumferential surface of the ring segment. The non-contact displacement probe, and any related data acquisition system electronics, generates displacement samples that are indicative of probe tip distance from the turbine blade tip. Variations in probe distance data are recorded as the blade circumferentially sweeps the turbine casing. In some embodiments, turbine blade sweep is accomplished by manually positioning one or more blade tips within the measurement zone of the probe tip of the displacement probe and taking static displacement measurement samples. In other embodiments, turbine blade sweep by rotating the engine shaft while the engine is in turning gear mode. A data analyzer system correlates the distance data samples with localized blade-tip clearance gap, by subtracting from the distance data sample the known distance between the probe tip of the non-contact, displacement sensor and the inner circumferential surface of the ring seal (e.g., through an inspection port aperture in the inner circumferential surface of a ring segment). In some embodiments, blade rotational position data are collected by a rotational position sensor. In those embodiments, the data processing system correlates the distance and rotational position data with localized blade tip-gap at angular positions about the turbine casing circumference. In other embodiments, correlation of tip-gap measurements to specific blades is accomplished by initiating tip gap measurement with a specifically designated blade, and subsequently correlating later gathered, individual tip-gap measurement samples with a corresponding number of each subsequent blade that passes under the tip-gap probe. In other words, the first sample is correlated with the first designated blade, the tenth sample with the tenth blade, etc.

Figure 1:
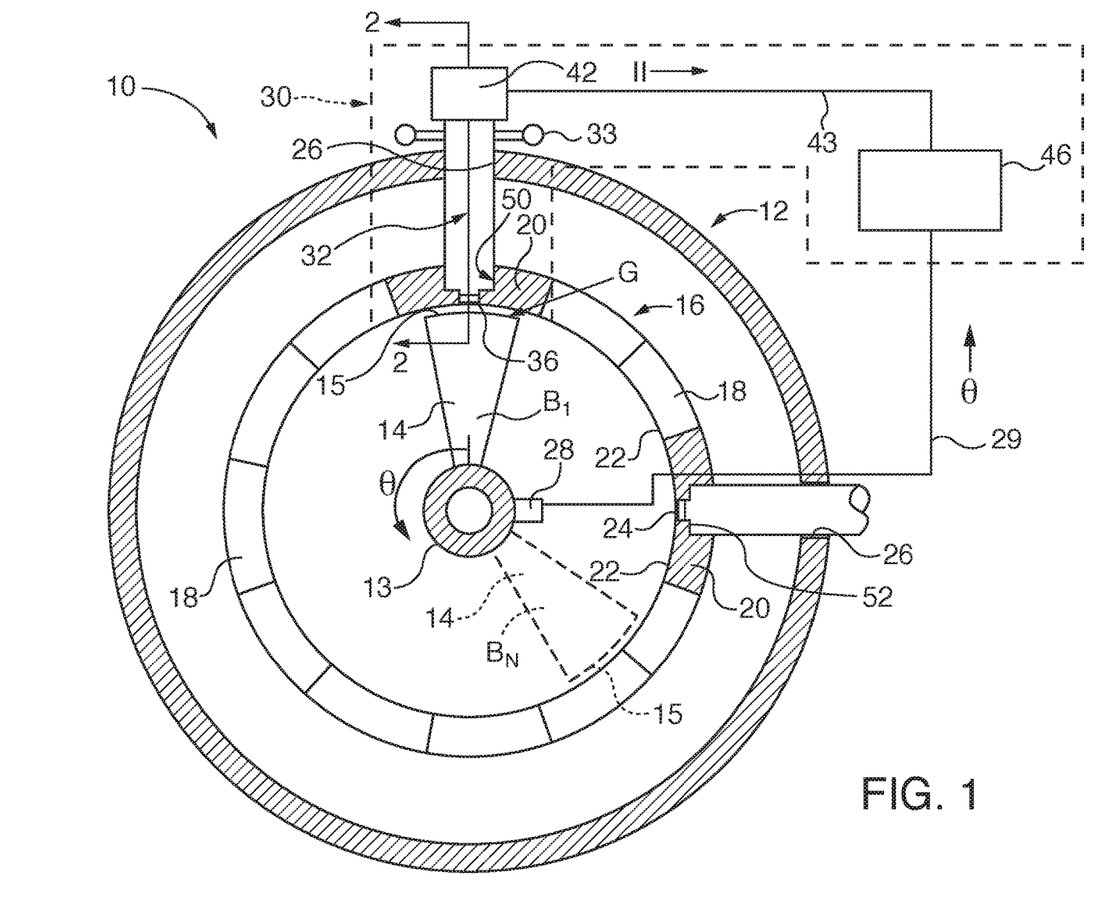
FIG. 1 is an elevational schematic view of an embodiment of a turbine tip gap clearance measurement system of the invention coupled to a combustion turbine engine, including a ring segment-mounted, contactless, displacement or distance probe system and a data acquisition system that are communicatively coupled to a data processing system outside the turbine via a wireless communication system.
Figure 2:
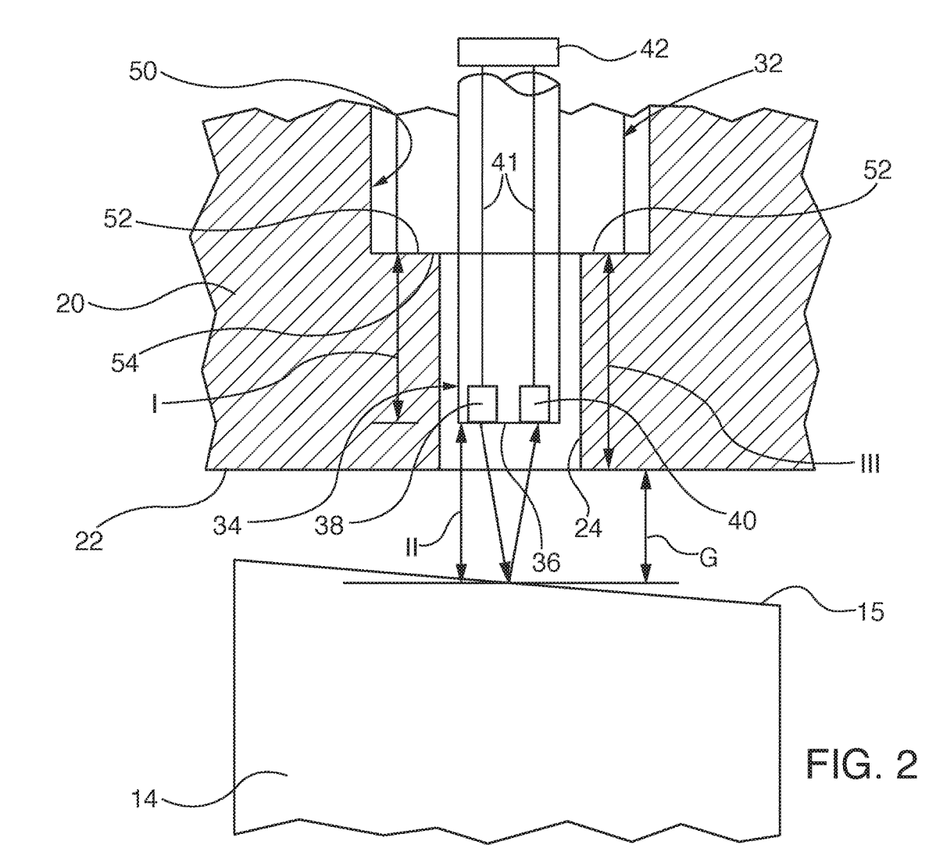
FIG. 2 is an enlarged, fragmentary, schematic view of an embodiment of the contactless, displacement probe system of FIG. 1, including displacement sensors and tip-gap inspection fixture, coupled to the ring segment of the combustion turbine engine, shown measuring tip gap G between a blade tip and the opposing, circumferential surface of a bare ring segment substrate.
Figure 3:
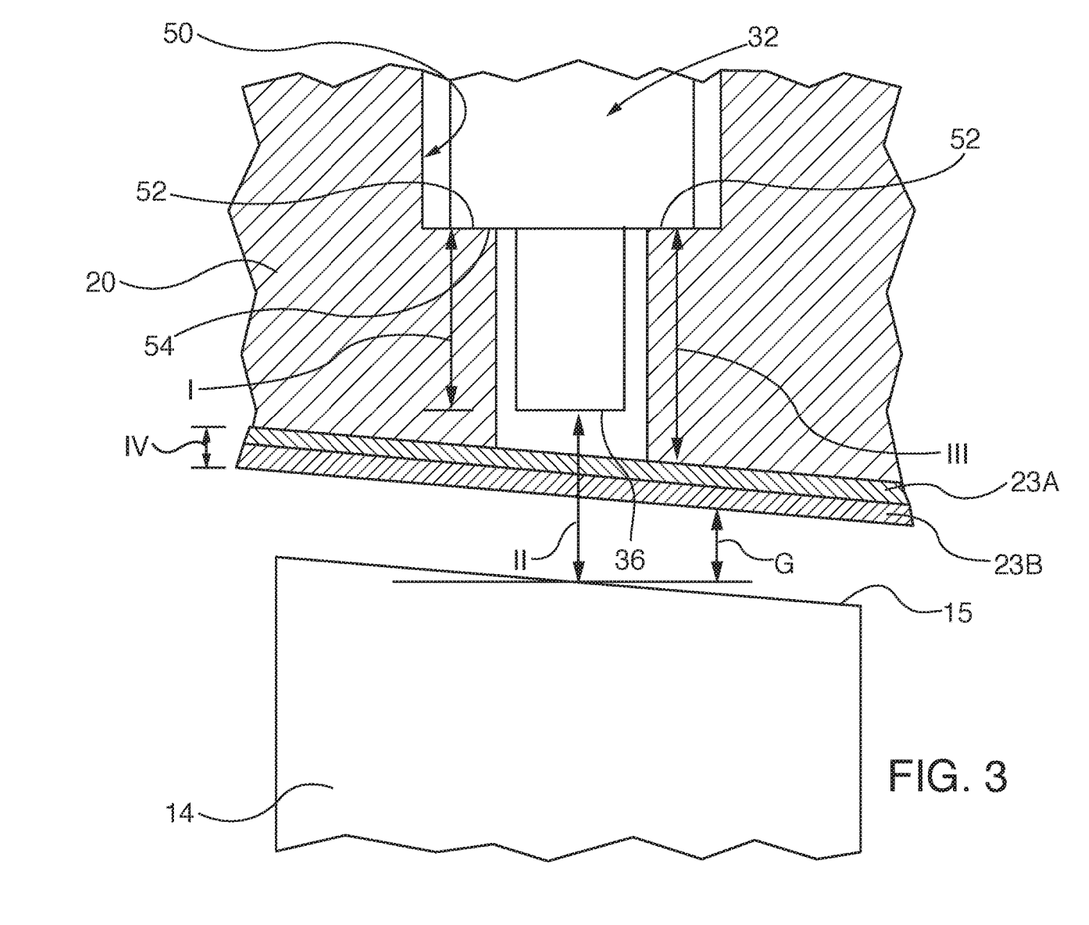
FIG. 3 is an enlarged, fragmentary, schematic view of an embodiment of the contactless probe system of FIG. 1, shown measuring tip gap G between a blade tip and the opposing, circumferential surface of ring segment substrate having one or more bond coats and/or thermal barrier coatings applied over the bare ring segment substrate.

FIGS. 1-3 show schematically a combustion turbine engine 10, with an engine outer casing 12, a rotating engine rotor 13. Affixed to the rotor 13 are a plurality of rows of turbine blades 14 that are designated $B_1$-$B_N$. Only a single blade row is schematically shown in FIG. 1. As a blade 14 rotates with the rotor 13, it defines a rotational displacement angle θ; its blade tip 15 sweeps the circumscribing inner surface circumferential rotor ring, which is also referred to as a ring seal 16. While the rotation angle θ is shown relative to a top dead center (12:00) rotational reference position, it can be designated relative to any circumferential position about the engine rotor or the ring seal 16.

The ring seal 16 comprises a plurality of annular-shaped ring segments 18, 20, which have metallic substrates. The respective, radially inwardly facing circumferential surfaces 22 of the ring segment substrates 18, 20 collectively define the circumscribing, inner circumferential surface of the ring seal 16. As shown in FIG. 3, in some engines 10, one or more metallic bond coat layers 23A, and/or thermal barrier coating layers 23B are applied over the bare metallic, inwardly facing circumferential surfaces 22 of the ring segment substrates, including for example the ring segment 20. Tip-gap G designates radial separation between the mutually opposed and spaced blade tip 15 and either the bare, metallic ring segment, inwardly facing circumferential surface 22 (FIGS. 1 and 2), or the outermost surface layer of the of the metallic bond coat layers and/or thermal barrier coating layers 23B (FIG. 3). As a turbine blade 14 rotates on the rotor 13, its blade tip 15 sweeps past the ring seal 16 tangentially relative to the rotational axis of the rotor.

As shown in FIG. 1, the ring segments 20, shown at the 12:00 and 3:00 circumferential positions about the ring seal 16, define inspection port apertures 24, which are in communication with an inspection port 26 formed through the engine outer casing 12. In some embodiments, inspection port apertures are also arrayed axially, from leading edge to trailing edge, within ring segments. In some embodiments, the engine incorporates a rotor angular position sensor 28, which senses the absolute rotational angular position θ of the rotor 13. "Absolute" rotational angular position means that the rotor's rotational position is ascertained in one rotational position sample, after any initial calibration, without need to manipulate the sample by resort to initialized angular position settings, or prior or subsequent sample readings, as is done by so-called "differential"-type rotational sensors. The angular position sensor 28 is of known construction, exemplary embodiments of which may include known tilt, gyroscopic, localized triangulated GPS-type sensors, or rotor-mounted encoding wheels with wheel-encoding sensors. Alternatively, the rotational position sensor function is performed by an existing turbine rotor, rotational position sensor that is incorporated in the operational control system of the engine 10. The sensed rotor angular position θ is outputted, via communications pathway 29, to a tip-gap inspection system 30.

Referring to FIGS. 1-4, the tip-gap inspection system 30 includes a tip-gap inspection fixture 32 that is inserted into the inspection port 26 within the engine outer casing 12 with optional handle 33. The tip-gap inspection fixture 32 has a contactless displacement probe 34, such as a non-contact, absolute-displacement sensor probe, in spatial communication with the inspection port aperture 24 of the ring segment 20.

Contactless displacement probe 34 has a displacement probe tip 36, aligned with the inspection port aperture 24, in radially opposed, spaced relationship relative to one or more of the sweeping blade tips 15, as the rotor 13 is rotated. The displacement probe tip 36 of the non-contact displacement probe has at least one photonic energy transmitter 38 and a corresponding photonic receiver 40 of known construction. In some embodiments, the transmitted and received photonic energy is in the infra-red or visible light spectrum. Alternatively, proximity-type, ultrasonic, non-contact displacement probes are substituted for the photonic, non-contact probe 34. The displacement probe 34 is coupled by cable 41 to a data-acquisition, electronics module 42. In some embodiments, the contactless, or non-contact, displacement probe 34 is a non-contact, absolute-displacement probe, which determines absolute distance between the displacement probe tip 36 and the blade tip 15 in a single displacement datum sample. "Absolute-displacement distance" means that the distance (II) of FIGS. 1-3 is ascertained in probe sample, after any initial calibration, without need to manipulate the sample by resort to initialized distance settings, or any prior or subsequent sample readings, as is done by so-called "differential"-type distance sensors.

The data-acquisition electronics module 42 converts elapsed time between transmission of the photonic transmitter 38 to the blade tip 15 and receipt of the reflected photons by the receiver 40 into relative separation distance between the probe tip 36 and the blade tips 15. That relative distance is designated by the arrow II, of FIGS. 2 and 3. Collectively, the displacement probe 34 and its associated data-acquisition electronics module 42 generate individual datum samples of displacement data. The displacement data samples are routed by communications pathway 43 to a data analyzer system 46, for blade-tip clearance determination. In this embodiment the communications pathway is established via a cable 43. In some embodiments, a wireless communication system, for example one utilizing known Bluetooth communications protocol, is substituted for the cable 41. In the exemplary embodiment of FIG. 1, the data analyzer system 46 is incorporated into a personal computer or tablet computer, which performs the analyzing functions through execution of non-transitory program instructions.

Referring to FIGS. 1-3, the exemplary tip-gap inspection system 30 determines bladetip-gap G, as follows. Radial distance (I) from the probe tip 36 of the contactless displacement probe 34 to a known reference location in ring-segment inspection port 50 of the ring segment 20 is known and provided to the data analyzer system 46. Here, the known reference location is a shoulder surface 52 of the cylindrical, stepped, inspection port 50. The radial distance (I) is length between the probe tip 36 and a shoulder surface 54 of the tip-gap inspection fixture 32. When the inspection fixture 32 is fully inserted into the inspection port 50 of the ring segment 20, the opposed shoulder surfaces 52 and 54 are in abutting contact, at the same radial position within the ring segment, relative to the rotational axis of the rotor 13. Radial distance (II) from the probe tip 36 of the contactless displacement probe 34 to the blade tip 15 is determined by the tip-gap inspection system 30, utilizing a displacement datum sample of the displacement data set, generated by the non-contact displacement probe 34, as previously described. The data analyzer 46 arithmetically adds or sums the known radial distance (I), and the radial distance (II), that was determined with the datum sample generated by the displacement probe 34. The arithmetic sum is the distance from the shoulder surface 52 of the inspection port 50 to the blade tip 15. Radial distance (III) between the same shoulder surface 52 and the inwardly facing, inner circumferential, substrate surface 22 of the ring segment 20 known during manufacture of the ring segment, and provided to the data analyzer system 46. The data analyzer system 46 determines the blade tip-ring segment clearance or tip-gap G by subtracting the known radial distance (III) from same shouldered surface 52 to the substrate surface 22 from the previously determined, arithmetic sum of the distances (I) and (II), as shown in FIG. 2. In engines having metallic bond coat layers 23A and/or thermal barrier coat layers 23B applied over the inwardly facing surface 22 of the substrate of the ring segment 20, the combined thicknesses (IV) of such coatings (generally a known and established manufacturing specification) is also subtracted from the prior arithmetic summation of (I)+(II)-(III), to determine the tip-gap G, as shown in FIG. 3.

Figure 4:
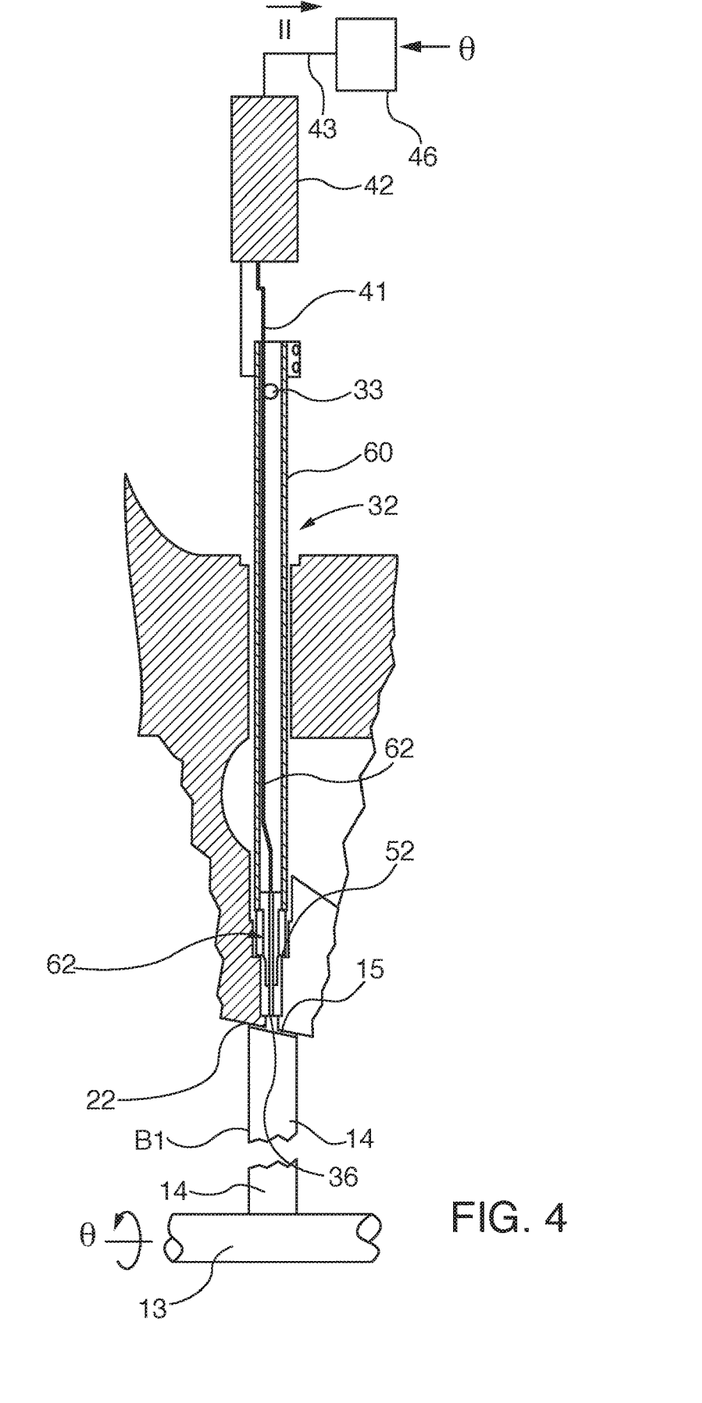
FIG. 4 is an axial, cross sectional view of the turbine tip gap clearance measurement system of FIG. 1, showing interconnection of the tip-gap inspection fixture and the engine ring segment.
Figure 5:
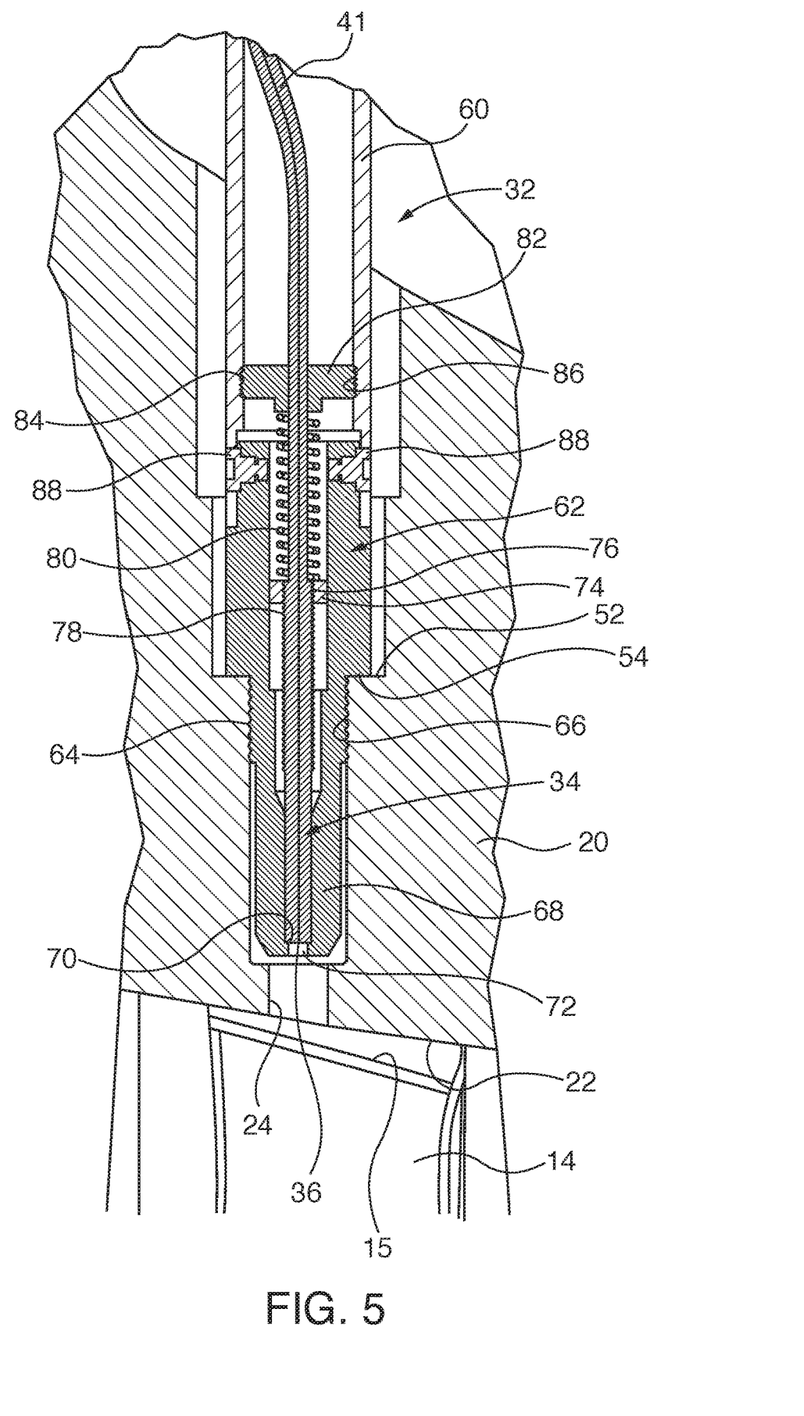
FIG. 5 is a detailed elevational view of the probe carrier screw-in collar of the tip-gap inspection fixture, its threaded interconnection with the ring segment inspection port, and mounting of the contactless displacement probe.

The tip-gap inspection fixture 32 is shown in detail in FIGS. 4 and 5. The inspection fixture 32 has an outer tube 60, having a proximal end oriented outside the exterior of the engine outer casing 12, and a distal end, to which is affixed a probe carrier 62. The probe carrier 62 forms the shoulder surface 54 of the tip-gap inspection fixture 32, and has male external threads, which are screwed into corresponding female threads 66 formed in the ring segment inspection port 50, so that the corresponding shoulder surfaces 54 and 52 of the inspection port abut against each other, previously described. The probe carrier 62 also forms a male tip 68, with an internal cavity that terminates in an internally formed tip shoulder 70 and a tip aperture 72. The tip aperture 72 of the probe carrier 62 is in spatial communication with the inspection port aperture 24 in the ring segment 20.

The non-contact, absolute-displacement probe 34 is captured, axially and radially, within the probe carrier 62, with the probe tip 36 biased against, and axially abutting the tip shoulder 70. Such biased, abutting contact is maintained by a captured, compression spring set, which comprises an annular-shaped, lower spring retainer 74, whose female internal threads 76 engage corresponding male threads 78 formed in the male tip 68. The lower spring retainer 74 is slidably captured within the internal cavity of the probe carrier 62. The compression spring set further comprises coil spring 80, which is captured between the lower spring retainer 74 and an upper spring retainer 82, and circumscribes the probe 34. The upper spring retainer 82 has external male threads about its outer circumference, which engage corresponding female threads 86 formed in the inner circumference of the outer tube 60. In other embodiments, other known biasing elements are substituted for the compression spring set, such as by non-limiting example, sprayed, expanding foam, axially compressed resilient washers, or o-rings, torsion springs, leaf springs, or compressed fluid dampers. The probe carrier 62 is affixed to the distal end of the outer tube 60 by fasteners 88.

When the contactless displacement probe 34 is captured in the previously described, biased fashion within the probe carrier 62, its probe tip 36 is in spatial communication with the blade tip 15, through the respective tip aperture 72 of the probe carrier 62 and the inspection port aperture 24 in the ring segment 20. The known radial distances (I) and (III) together establish a fixed, radial baseline distance between the probe tip 36 and the inwardly facing circumferential surface 22 of the ring segment substrate 20. Thus displacement radial distance (II) between the probe tip 36 and the blade tip 15 (minus the thickness (IV)) of any protective coating layers (e.g., bond coat 23A and/or thermal barrier coat 23B) applied to substrate surface 22 is directly proportional to the blade-tip-gap G.

In some embodiments, a plurality of displacement samples (II) are captured and recorded periodically and sequentially in the tip-gap inspection system 30, as the turbine rotor 13 is rotated in turning gear mode. The individual displacement datum sample or plurality of displacement data samples (II), are correlated with the clearance tip-gap G of individual blades 14, so that blade tip-ring segment clearance for one or more of the blades, and/or variations of such clearance across width of an individual blade is determined. In embodiments where inspection apertures 24 are also arrayed axially from the leading edge to the trailing edge of the ring segment 20, additional tip-gap G measurements from the leading to trailing ends of the blade tips 15 are obtained by installing the tip-gap inspection system 30 in those additional inspection aperture locations.

In some embodiments, the rotor position encoder (rotor rotational-position sensor) 28 provides rotor angular position $\theta$ information to the data analyzer 46. The data analyzer correlates one or more contactless displacement probe samples (II) and the rotor angular position information $\theta$ provided by the rotor position encoder with an individual turbine blade that is coupled to the rotor at a known, fixed angular position on the rotor circumference. For example, if blade $B_N$ is known to be oriented at 240 degrees on the rotor 13, the data analyzer will associate a sample distance (II) taken by the contactless probe 34 while the rotor is at angular position 240 degrees with blade $B_N$. Upon completion of such correlation by the data analyzer 46, a viewer obtains blade-tip clearance information G for one or more blades 14 that sweep the contactless probe 34 at its sampling rate. Depending upon the sampling rate utilized by the tip-gap inspection system 30, one or more gap G clearance readings are obtained across individual blades (e.g., from the pressure side to the suction side of the blade tip) automatically, in real time.

While the contactless displacement probe 34 and angular position sensor 28 are shown in FIGS. 1 and 3 as being coupled to the data analyzer system 46 by respective hard communication pathways 29 and 43, alternative locations and data feed configurations are possible in other embodiments. For example, in other embodiments, the displacement probe 34 and the angular position sensor 28 (rotor rotational-position sensor) are coupled jointly or severally to a wireless communication module that in turn communicates with the data analyzer 46.

Similarly, in other embodiments, the computational functions performed by the displacement probe electronics module 42, for transmitter 38/receiver 40 sample data acquisition and conversion to radial distances (II) between the probe tip 36 of the contactless displacement probe 34 and the respective blade tips 15 are integrated into the data analyzer (e.g., a personal computer or tablet computer executing stored, non-transitory software instructions).

Blade-tip gap G and relative rotational position information in the data analyzer 46 is available for further analysis, including by way of example relative concentric alignment of the rotor, rotor blades, turbine vanes and the turbine casing inner diameter, concentricity of the turbine casing itself and identification of potential localized wear patterns within the turbine casing lining. If multiple contactless displacement probes 34 are utilized across the axial length of the blade tip 15 (i.e., from leading to trailing edge or any axial portion thereof), in multiple, axially-aligned, inspection ports 50 defined by the ring segment substrate 20 annular patterns, rather than just circular patterns of blade tip gap G about the three-dimensional ring segments 18 circumference of the ring seal 16 are acquired and analyzed. Displacement sampling at different inspection ports 50 about the ring segments 18 of the ring seal 16 are selectively performed sequentially or in parallel.

While reference to an data analyzer 46 platform (e.g., a personal computer or tablet computer) architecture and implementation by non-transitory software modules executed by a processor in such platform, it is also to be understood that exemplary embodiments of the invention may be implemented in various forms of hardware, software, firmware, special purpose processors, or a combination thereof. Preferably, aspects of the invention embodiments are implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may be either part of the microinstruction code or part of the program (or combination thereof) which is executed via the operating system. In addition, various other peripheral devices may be connected to the computer/controller platform.

It is to be understood that, because some of the constituent system components and method steps depicted in the accompanying figures are preferably implemented in software in the data analyzer 46, the actual connections between the system components (or the process steps) may differ depending upon the manner in which the exemplary embodiments are programmed. Specifically, any of the computer platforms or devices may be interconnected using any existing or later-discovered networking technology; they all may be connected through a lager network system, such as a corporate network, metropolitan network or a global network, such as the Internet.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms 'mounted"' connected". "supported", and "coupled" and variations thereof are used broadly and encompass direct and indirect mountings, connections, supports, and couplings. Further, "connected" and "coupled" are not restricted to physical or mechanical connections or couplings.

What is claimed is:

1. A method for measuring radial clearance gap between one or more blade tips and an opposing, inner circumferential surface of a ring seal within a turbine casing of a turbine engine, comprising:

providing a turbine engine with an engine outer casing and ring seal, which circumscribe an in situ, rotatable rotor having a row of turbine blades, each blade respectively having an airfoil and a blade tip in opposed spaced relationship with an inner circumferential surface of the ring seal, defining a tip gap there between; the ring seal having a necked, cylindrical-profile inspection port that is accessible from outside the engine outer casing, the inspection port defining a central axis that is axially and radially aligned with tangential swept path of the blade tips, and including: an upper cylindrical portion having a first diameter, which is contiguous with an outer diameter of an inspection port shoulder, an inner diameter of the inspection port shoulder contiguous with smaller second diameter, inspection port aperture; the inspection port aperture terminating and coextensive with the inner circumferential surface of the ring seal, and defining female threads on an outer circumference thereof;

providing a tip-gap inspection system, including:
a tip-gap inspection fixture having: an outer tube for insertion of a distal end thereof into the inspection port of the ring seal; a probe carrier coupled to the distal end of the outer tube, defining a probe carrier shoulder and male threads for engagement with the female threads of the inspection port aperture; a non-contact, absolute-displacement sensor probe, coupled to the probe carrier, the probe having a probe tip, for generating a displacement data set, indicative of absolute relative distance between the probe tip and any one of the respective blade tips that is aligned therewith, without rotor rotation or reference to relative, differential displacement data of any other blade tip;
a data acquisition system, coupled to the sensor probe, for converting the displacement data to actual absolute distance between the probe tip and the respective blade tips that are aligned therewith; and
a data analyzer system, coupled to the data acquisition system, for determining absolute radial clearance gap between any one or more of the respective, individual blade tips and the inner circumferential surface of the ring seal by:
determining actual absolute distance between the probe tip and each respective blade tip with the displacement data provided by the data acquisition system; and
thereafter subtracting from the determined absolute distance between the probe tip and the respective blade tip, a known distance between the probe tip and the inner circumferential surface of the ring seal that is contiguous with the probe aperture;
inserting and rigidly coupling the outer tube of the tip-gap inspection fixture into the inspection port, in fixed alignment with the inspection port aperture, by engaging and screwing together the respective threads of the probe carrier and the inspection port aperture, until the respective shoulders thereof are in abutting contact with each other, so that the probe tip of the displacement probe is radially aligned, in fixed, opposed, spaced relationship with the swept path of the blade tips;
rotating the rotor so that the blade tips of one or more respective blades sweeps the inspection port aperture and the probe tip of the non-contact, absolute-displacement sensor probe, while generating the displacement data set, inclusive of data for each individual sweeping blade;
acquiring the displacement data set with the data acquisition system; and
determining, with the displacement data set and the data analyzer, tip-gap between each respective blade tip and the ring seal at the inspection port aperture, by:
obtaining from the data acquisition system, a displacement data sample that is indicative of actual absolute distance between the probe tip and the respective blade tip; and
thereafter, subtracting from the obtained absolute distance between the probe tip and the respective blade tip, a previously known distance between the probe tip and the inner circumferential surface of the ring seal that is contiguous with the probe aperture.

2. The method of claim 1, further comprising:
aligning a first blade in the blade row of the rotor with the displacement sensor probe and obtaining a first displacement sample with the data acquisition system;
rotating the rotor, so that other blades in the blade row are sequentially aligned with the displacement sensor probe and obtaining a respective displacement sample for each subsequent blade with the data acquisition system;
associating, with the data analyzer, each obtained respective displacement sample with its corresponding blade, by matching order sequence of the respective collected displacement samples with order sequence of blade alignment with the displacement sensor probe; and
determining with the data analyzer, tip-gap of each blade in the rotor's rotation sequence.

3. The method of claim 1, further comprising the data analyzer system determining absolute radial clearance gap by:
determining actual absolute distance between the probe tip and each respective blade tip with the displacement data provided by the data acquisition system;
thereafter subtracting from the determined absolute distance between the probe tip and the respective blade tip, a known distance between the probe tip and the inner circumferential surface of the ring seal that is contiguous with the probe aperture and thickness of any bond and/or thermal barrier coating layers that are applied over the inner circumferential surface of the ring seal.

4. The method of claim 1, the provided tip-gap inspection fixture further comprising:

the probe carrier defining a probe carrier tip projecting distal the probe carrier shoulder and incorporating the probe carrier's male threads, for engagement with the corresponding female threads within the inspection port aperture, the probe carrier tip having an internal cavity that defines a carrier tip shoulder and a carrier tip aperture, facilitating communication between the internal cavity and the inspection port aperture;

the probe tip of the displacement sensor probe retained in fixed position within the probe carrier's internal cavity, in abutting engagement with the carrier tip shoulder, and in communication with the inspection port aperture through the carrier tip aperture.

5. The method of claim 4, the provided tip-gap inspection fixture further comprising:

a biasing element in the probe carrier, for biasing the probe tip in abutting engagement with the carrier tip shoulder.

6. The method of claim 5, the biasing element comprising:

a lower spring retainer rigidly coupled to the probe and slidably engaged within the probe tip cavity;

an upper spring retainer rigidly coupled to the tip-gap inspection fixture; and a spring captured between the upper and lower spring retainers.

7. A method for measuring radial clearance gap between one or more blade tips and an opposing, inner circumferential surface of a ring seal within a turbine casing of a turbine engine, comprising:

providing a turbine engine with an engine outer casing and ring seal, which circumscribe an in situ, rotatable rotor having a row of turbine blades, each blade respectively: oriented at a known angular position about the rotor circumference, having an airfoil and a blade tip in opposed spaced relationship with an inner circumferential surface of the ring seal, defining a tip gap there between; the ring seal having a necked, cylindrical-profile inspection port that is accessible from outside the engine outer casing, the inspection port defining a central axis that is axially and radially aligned with tangential swept path of the blade tips, and including: an upper cylindrical portion having a first diameter, which is contiguous with an outer diameter of an inspection port shoulder, an inner diameter of the inspection port shoulder contiguous with smaller second diameter, inspection port aperture; the inspection port aperture terminating and coextensive with the inner circumferential surface of the ring seal, and defining female threads on an outer circumference thereof;

providing a tip-gap inspection system, including:

a tip-gap inspection fixture having: an outer tube for insertion of a distal end thereof into the inspection port of the ring seal; a probe carrier coupled to the distal end of the outer tube, defining a probe carrier shoulder and male threads for engagement with the female threads of the inspection port aperture; a non-contact, absolute-displacement sensor probe, coupled to the probe carrier, the probe having a probe tip, for generating a displacement data set, indicative of absolute relative distance between the probe tip and any one of the respective blade tips that is aligned therewith, without rotor rotation or reference to relative, differential displacement data of any other blade tip;

a rotor rotational-position sensor, for generating a rotational-position data set indicative of absolute rotor rotational position relative to the ring seal, as the rotor is rotated;

a data acquisition system, coupled to the sensor probe, for converting the displacement data to actual absolute distance between the probe tip and the respective blade tips that are aligned therewith; and a data analyzer system, coupled to the rotor rotational position sensor, and the data acquisition system, for determining absolute radial clearance gap between any one or more of the respective, individual blade tips and the inner circumferential surface of the ring seal by:

determining actual absolute distance between the probe tip and each respective blade tip with the displacement data provided by the data acquisition system; and thereafter subtracting from the determined absolute distance between the probe tip and the respective blade tip, a known distance between the probe tip and the inner circumferential surface of the ring seal that is contiguous with the probe aperture;

inserting and rigidly coupling the outer tube of the tip-gap inspection fixture into the inspection port, in fixed alignment with the inspection port aperture, by engaging and screwing together the respective threads of the probe carrier and the inspection port aperture, until the respective shoulders thereof are in abutting contact with each other, so that the probe tip of the displacement probe is radially aligned, in fixed, opposed, spaced relationship with the swept path of the blade tips;

rotating the rotor so that the blade tips of one or more respective blades sweeps the inspection port aperture and the probe tip of the non-contact, absolute-displacement sensor probe, while generating the displacement data set and the rotational-position data set, inclusive of data for each individual sweeping blade;

simultaneously acquiring the rotational-position data set from the rotational-position sensor with the data analyzer system and the displacement data set with the data acquisition system;

the data analyzer determining, with the rotational-position and displacement data sets, tip-gap between each respective blade tip and the ring seal at the inspection port aperture, by:

obtaining from the data acquisition system, a displacement data sample that is indicative of actual absolute distance between the probe tip and the respective blade tip;

thereafter, subtracting from the obtained absolute distance between the probe tip and the respective blade tip, a previously known distance between the probe tip and the inner circumferential surface of the ring seal that is contiguous with the probe aperture;

obtaining from the rotational-position sensor a rotational-position sample, which corresponds to the obtained displacement data sample; and associating the rotational-position sample with a specific turbine blade whose tip is aligned with the probe tip of the non-contact, absolute-displacement sensor probe, based on prior knowledge of specific blade angular orientation about the rotor circumference.

8. The method of claim 7, further comprising the data analyzer system determining absolute radial clearance gap by:

determining actual absolute distance between the probe tip and each respective blade tip with the displacement data provided by the data acquisition system;

thereafter subtracting from the determined absolute distance between the probe tip and the respective blade tip, a known distance between the probe tip and the inner circumferential surface of the ring seal that is contiguous with the probe aperture and thickness of any bond and/or thermal barrier coating layers that are applied over the inner circumferential surface of the ring seal.

9. The method of claim 7, the provided tip-gap inspection fixture further comprising:

the probe carrier defining a probe carrier tip projecting distal the probe carrier shoulder and incorporating the probe carrier's male threads, for engagement with the corresponding female threads within the inspection port aperture, the probe carrier tip having an internal cavity that defines a carrier tip shoulder and a carrier tip aperture, facilitating communication between the internal cavity and the inspection port aperture;

the probe tip of the displacement sensor probe retained in fixed position within the probe carrier's internal cavity, in abutting engagement with the carrier tip shoulder, and in communication with the inspection port aperture through the carrier tip aperture.

10. The method of claim 9, the provided tip-gap inspection fixture further comprising:

a biasing element in the probe carrier, for biasing the probe tip in abutting engagement with the carrier tip shoulder.

11. The method of claim 10, the biasing element comprising:

a lower spring retainer rigidly coupled to the probe and slidably engaged within the probe tip cavity;

an upper spring retainer rigidly coupled to the tip-gap inspection fixture; and a spring captured between the upper and lower spring retainers.

12. An inspection system for measuring radial clearance gap (tip-gap) between one or more blade tips and an inner circumferential surface of a ring seal within a turbine engine, comprising:

a turbine engine having an engine outer casing and ring seal, which circumscribe an in situ, rotatable rotor having a row of turbine blades, with each blade respectively oriented at a known angular position about the rotor circumference, having an airfoil and a blade tip in opposed spaced relationship with an inner circumferential surface of the ring seal, defining the tip gap there between; the ring seal having a necked, cylindrical-profile inspection port that is accessible from outside the engine outer casing, the inspection port defining a central axis that is axially and radially aligned with tangential swept path of the blade tips, and including:

an upper cylindrical portion having a first diameter, which is contiguous with an outer diameter of an inspection port shoulder, an inner diameter of the inspection port shoulder contiguous with smaller second diameter, inspection port aperture; the inspection port aperture terminating and coextensive with the inner circumferential surface of the ring seal, and defining female threads on an outer circumference thereof;

a tip-gap inspection fixture having:

an outer tube for insertion of a distal end thereof into the inspection port of the ring seal of the turbine engine;

a probe carrier coupled to the distal end of the outer tube, defining a probe carrier shoulder and male threads for screw-in engagement with the female threads of the inspection port aperture, until the respective shoulders of the probe carrier and the inspection port are in abutting contact with each other;

a non-contact, absolute-displacement sensor probe, coupled to the probe carrier, the probe having a probe tip, for generating a displacement data set, indicative of absolute relative distance between the probe tip and any one of the respective blade tips that is aligned therewith, without rotor rotation or reference to relative, differential displacement data of any other blade tip, the probe tip axially and radially aligned, in fixed, opposed, spaced relationship with the tangential swept path of the blade tips;

a rotor rotational-position sensor, for generating a rotational-position data set indicative of absolute rotor rotational position relative to the ring seal, as the rotor is rotated;

a data acquisition system, coupled to the sensor probe, for converting the displacement data to actual absolute distance between the probe tip and the respective blade tips that are aligned therewith; and a data analyzer system, coupled to the rotor rotational position sensor, and the data acquisition system, for determining tip-gap between each respective blade tip and the ring seal at the inspection port aperture with the rotational-position and displacement data sets, by:

obtaining from the data acquisition system, a displacement data sample that is indicative of actual absolute distance between the probe tip and the respective blade tip;

thereafter, subtracting from the obtained absolute distance between the probe tip and the respective blade tip, a previously known distance between the probe tip and the inner circumferential surface of the ring seal that is contiguous with the probe aperture;

obtaining from the rotational-position sensor a rotational-position sample, which corresponds to the obtained displacement data sample; and associating the rotational-position sample with a specific turbine blade whose tip is aligned with the probe tip of the non-contact, absolute-displacement sensor probe, based on prior knowledge of specific blade angular orientation about the rotor circumference.

13. The system of claim 12, further comprising the data analyzer system determining absolute radial clearance gap by:

determining actual absolute distance between the probe tip and each respective blade tip with the displacement data provided by the data acquisition system;

thereafter subtracting from the determined absolute distance between the probe tip and the respective blade tip, a known distance between the probe tip and the inner circumferential surface of the ring seal that is contiguous with the probe aperture and thickness of any bond and/or thermal barrier coating layers that are applied over the inner circumferential surface of the ring seal.

14. The system of claim 12, the tip-gap inspection fixture further comprising:

the probe carrier defining a probe carrier tip projecting distal the probe carrier shoulder and incorporating the probe carrier's male threads, for engagement with the corresponding female threads within the inspection port aperture, the probe carrier tip having an internal cavity that defines a carrier tip shoulder and a carrier tip aperture, facilitating communication between the internal cavity and the inspection port aperture;

the probe tip of the displacement sensor probe retained in fixed position within the probe carrier's internal cavity, in abutting engagement with the carrier tip shoulder, and in communication with the inspection port aperture through the carrier tip aperture.

15. The system of claim 14, the tip-gap inspection fixture further comprising:
a biasing element in the probe carrier, for biasing the probe tip in abutting engagement with the carrier tip shoulder.

16. The system of claim 15, the biasing element comprising:
a lower spring retainer rigidly coupled to the probe and slidably engaged within the probe tip cavity;
an upper spring retainer rigidly coupled to the tip-gap inspection fixture; and
a spring captured between the upper and lower spring retainers.

17. The system of claim 16, further comprising:
an annular-shaped lower spring retainer, defining female threads on its inner circumference, in engagement with corresponding male threads formed on the displacement sensor probe;
an annular-shaped upper spring retainer, defining male threads on its outer circumference, in engagement with corresponding female threads formed within an inner wall of the outer tube of the tip-gap inspection fixture; and
a coil spring captured between the respective upper and lower annular-shaped spring retainers, within the internal cavity of the probe tip carrier, the coil spring circumscribing the displacement sensor probe.

18. The system of claim 12, the non-contact, absolute-displacement sensor probe comprising a non-contact, visible light or infra-red, photonic displacement sensor having a transmitter and a receiver.

19. The system of claim 12, the non-contact, absolute-displacement sensor probe comprising an ultrasonic proximity sensor.

* * * * *